US006364275B1

(12) United States Patent
Lindsay

(10) Patent No.: US 6,364,275 B1
(45) Date of Patent: Apr. 2, 2002

(54) ROTARY LOAD COUNTERBALANCING MECHANISMS

(75) Inventor: Richard Arthur Lindsay, Eye (GB)

(73) Assignee: Vitec Group, PLC, Suffolk (GB)

( * ) Notice: Subject to any disclaimer, the term of this patent is extended or adjusted under 35 U.S.C. 154(b) by 0 days.

(21) Appl. No.: 09/367,181

(22) PCT Filed: Dec. 5, 1997

(86) PCT No.: PCT/GB97/03376

§ 371 Date: Oct. 6, 1999

§ 102(e) Date: Oct. 6, 1999

(87) PCT Pub. No.: WO98/36208

PCT Pub. Date: Aug. 20, 1998

(30) Foreign Application Priority Data

Feb. 12, 1997 (GB) ............................................. 9702800

(51) Int. Cl.$^7$ ................................................. F16M 1/00
(52) U.S. Cl. ................... 248/648; 248/292.11; 248/364
(58) Field of Search ............................. 248/123.11, 648, 248/162.1, 280.11, 292.12, 364, 372.1, 292.11; 108/7, 2; 74/569

(56) References Cited

U.S. PATENT DOCUMENTS 4,726,253 A  2/1988  Russell ........................ 74/569
5,605,101 A * 2/1997  Lindsay ........................ 108/7

FOREIGN PATENT DOCUMENTS

| GB | 2 102 757 | 2/1983 |
| GB | 2 231 548 | 11/1990 |
| WO | 94 07080 | 3/1994 |

* cited by examiner

Primary Examiner—Anita King
Assistant Examiner—Gwendolyn Baxter
(74) Attorney, Agent, or Firm—Kenyon & Kenyon

(57) ABSTRACT

The disclosure related to a rotary counterbalancing mechanism comprising a rotatable input (19, 22), a pair of aligned linearly movable outputs (24, 25), means (23) to convert rotation of said input into sinusoidal oscillation of said outputs between minimum and maximum displacement positions and 90° out of phase with each other and spring means (29) for resisting said oscillating movement of the outputs away from said minimum positions. The means to convert rotary motion of the input into linear movement of said two outputs comprise a rotatable cam (23) mounted to rotate about a fixed axis and the outputs comprise two cam followers (30) engaging the cam on opposite sides thereof and mounted for linear movement along a common line of action with each other which passes through the axis or rotation of the cam, said spring means (29) acting on the respective followers biasing the followers towards the cam to resist rotation of the cam.

5 Claims, 1 Drawing Sheet

ROTARY LOAD COUNTERBALANCING MECHANISMS

Figure 2:
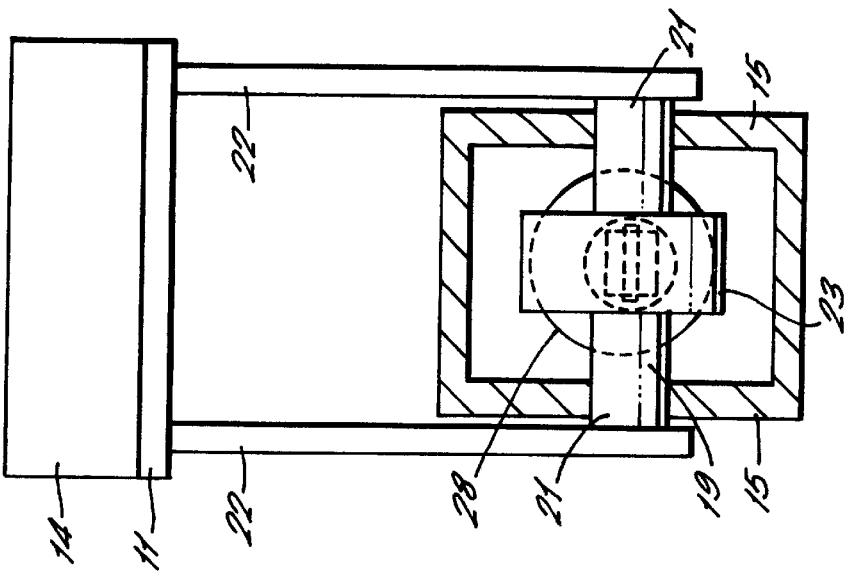

This invention relates to rotary load counterbalancing mechanisms and more particularly, although not exclusively, to tilt mounting heads for counterbalancing the torque caused by the out of balance mass of a camera or the like mounted thereon when rotated about the tilt axis.

Many load counterbalancing mechanisms are known including hydraulic or pneumatic devices and springs loaded through lever or cam arrangements. Our UK Patent Specification No. 2102757 discloses a multiple spring and lever arrangement which provides true balance and is also capable of adjustment to accommodate different loads but is relatively complex and bulky and can therefore be difficult to accommodate. An important requirement of a counterbalancing mechanisms and particularly mechanisms to be embodied in a tilt mounting for a camera is that the mechanism should be compact so that the overall bulk of the mounting can be kept to a minimum.

WO-A-94/07080 discloses a tiltable mounting for a payload comprising a base and a support member for supporting the pay load. The support member is tiltable about a horizontal axis on the base for tilting about each side of a top dead centre position about said horizontal axis. Torque generating devices are mounted on the base and act on the tiltable support to generate a torque in response to tilting of the support equal and opposite to the outer balance moment of the support with its payload to hold the support balanced in any position of movement about said axis. The tiltable support has two stub shafts on which the support is mounted for tilting about said horizontal axis and two torque generating units are provided which act on the respective stub shafts, each of which provides a torque which varies sinusoidally with displacement. A control is provided for adjusting the torque generating unit for varying the phase angle between the units to vary the collective amplitude of the torque developed by the units for any position of movement of the tiltable torque member to suit the weight of the payload on the support member.

This invention provides a rotary counterbalancing mechanism comprising an input rotatable about a horizontal axis for carrying a mass and means to generate a counterbalancing torque when the input is rotatably displaced from a neutral position in which the mass is disposed vertically above said horizontal axis, wherein the means for generating the counterbalancing torque comprise a pair of aligned linearly moveable outputs, means to convert rotation of the input from said neutral position into sinusoidal displacements of said outputs which are 90° out of phase with each other, between minimum and maximum displacement positions, and spring means for resisting said oscillating movement of the outputs away from said minimum displacement positions.

Preferably the means to convert rotary motion of the input into linear movement of said two outputs comprise a rotatable cam mounted to rotate with said input about said horizontal axis and the outputs comprise two cam followers engaging the cam on opposite sides thereof and mounted for linear movement along a common line of action with each other which passes through the axis of rotation of the cam, said spring means acting on the respective followers biasing the followers towards the cam to resist rotation of the cam.

More specifically, providing said minimum displacement positions for the outputs at a recess at the top of the heart and at the base of the heart.

In any of the above arrangements, the spring means may be arranged to resist the movement of the cam followers in compression.

In one particular example according to the invention, the spring means are arranged parallel to one another with one end of each spring means anchored and the other end coupled to a respective cam follower.

Figure 1:
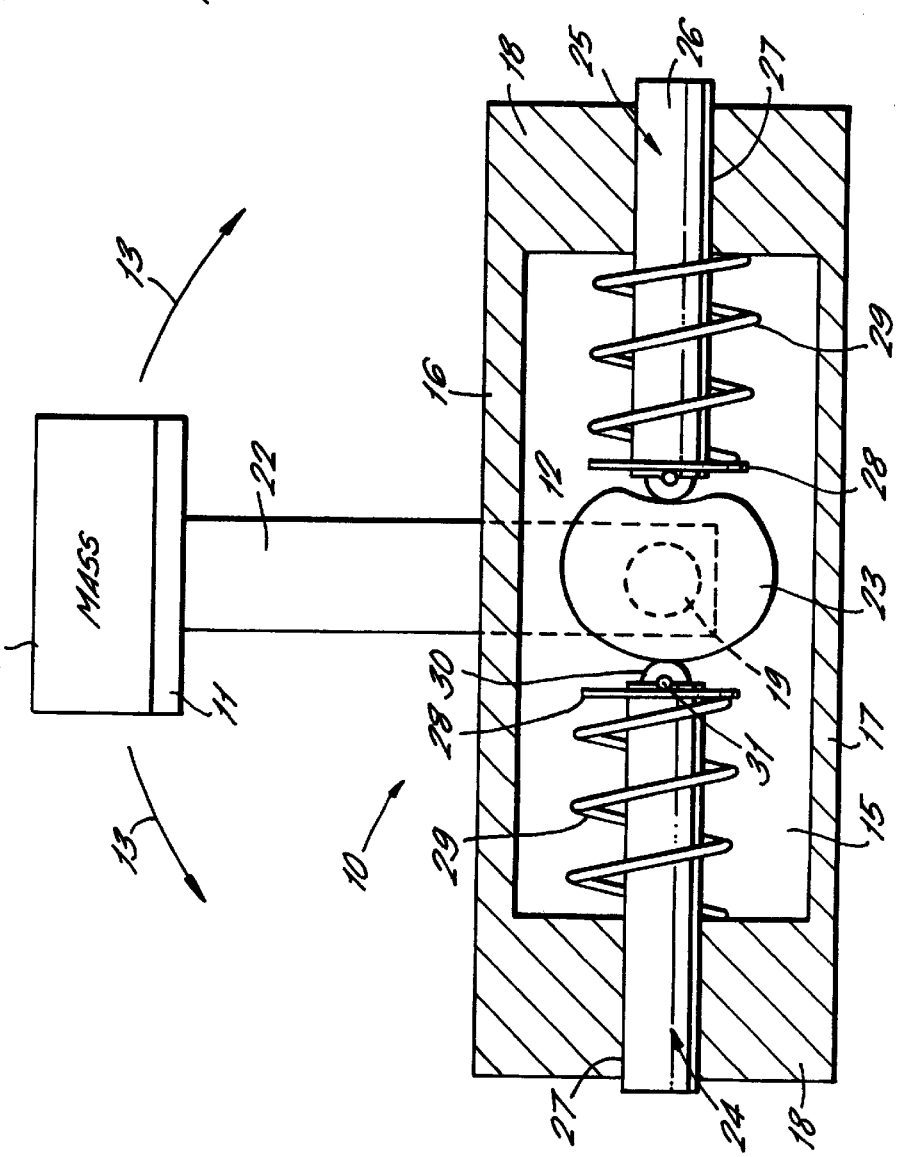

The following is a specific embodiment of the invention, reference being made to the accompanying drawings, in which:

FIG. 1 is a side elevation view of a rotary load counterbalancing mechanism suitable for a tilt mounting for a TV or cinematograph type camera; and FIG. 2 is an end view of the mounting.

Referring firstly to FIG. 1 of the drawings, there is shown a mounting for a television or video camera comprising an elongate horizontally extending base indicating generally at 10 on which a platform 11 is mounted to pivot about a horizontal axis 12 extending through the housing in the direction of the arrows 13 and on which a camera indicated diagrammatically at 14 is mounted.

The housing 10 is of elongate horizontally extending hollow box form having a rectangular cross-section. The housing has side walls 15 top and bottom walls 16, 17 and end walls 18.

A horizontally extending shaft 19 extends through the housing and is mounted in bearings (not shown) in the side walls 15 of the housing to support the shaft for rotation about the aforesaid axis 12. The ends of the shaft project from the side walls 15 of the housing as indicated at 21 and a pair of parallel arms 22 are secured at their lower ends to the projecting ends of the shaft. The platform 11 is mounted at the upper ends of the arms. The platform and its camera are therefore supported on the arms 22 to pivot from the neutral, vertical position about the axis 12 to either side of the vertical, as indicated by the arrows 13. Pivotal movement of the platform is controlled by a counterbalancing arrangement mounted in the housing 10 whereby the platform can be moved to any position in its range of tilt about the housing and an appropriate counter-balancing force is automatically generated to support the platform in position. The counterbalancing mechanism will now be described. A detailed mathematical analysis of a tilting platform carrying a certain mass and resisted by a pair of springs is to be found in our aforesaid UK Patent Specification No. 2102757 to which reference should be made.

The counterbalancing mechanism comprises a cam 23 mounted on the shaft 21 within the housing, the cam having a heart shaped profile which is symmetrical about a horizontal axis extending through the pivot axis 12 when the arms 22 are in the neutrally vertical position as shown in FIG. 1. Two similar cam followers indicated at 24 and 25 act on opposite sides of the cam. Each follower comprises a plunger 26 mounted in a horizontal bore 27 in an end wall 18 of the housing to slide towards and away from the cam. Each plunger has an end plate 28 fixed to the end of a plunger and a compression spring 29 acts between the plate and end wall to force the plunger towards the cam. The end of the plunger has a roller 30 mounted therein on a spindle 31 to provide smooth rolling engagement with the cam surface as the cam rotates between the respective plungers.

The cam followers engage opposing halves of the cam as it rotates on the shaft with tilting of the platform. The halves of the cam are shaped to provide sinusoidal movements of the cam followers according to the shapes of the halves of the cam engaged by the followers through tilting of the platform ±90° from the position illustrated with the platform in its neutral position. The cam followers are held against the cam by the compressive forces of the springs 28 which will therefore vary sinusoidally with angle of tilt from the neutral position of the platform/arm assembly. The resulting forces resisting rotation of the cam 23 from its neutral position provides a counterbalancing force equal to and opposite the out of balance force of the mass/platform assembly so that the platform is supported fully counterbalanced at any position of tilt to which it is adjusted.

It will be appreciated that a variety of other similar forms of mechanism can be utilised to provide two sinusoidally varying outputs which have minimum and maximum displacement positions 90° out of phase to provide the counterbalancing affect indicated above. For example, a swash plate mechanism could be utilised.

What is claimed is:

1. A rotary counterbalancing mechanism comprising an input rotatable about a horizontal axis for carrying a mass and means to generate a counterbalancing torque when the input is rotatably displaced from a neutral position in which the mass is disposed vertically about said horizontal axis, wherein the means for generating the counterbalancing torque comprise a pair of aligned linearly movable outputs, cam means to convert rotation of the input from said neutral position into sinusoidal displacements of said outputs which are 90° out of phase with each other, between minimum and maximum displacement positions which correspond to the neutral position and positions of the input at 90° to the neutral position and spring means for resisting said oscillating movement of the outputs away from said minimum displacement positions.

2. A rotary counterbalancing mechanism as claimed in claim 1, wherein the cam means to convert rotary motion of the input into linear movement of said two outputs comprise a rotatable cam mounted to rotate with said input about said horizontal axis and the outputs comprise two cam followers engaging the cam on opposite sides thereof and mounted for linear movement along a common line of action with each other which passes through the axis of rotation of the cam, said spring means acting on said two followers respectively biasing the followers towards the cam to resist rotation of the cam.

3. A rotary counterbalancing mechanism as claimed in claim 1, wherein the cam is heart shaped providing said minimum displacement positions for the outputs at a recess at the top of the heart and at the base of the heart and maximum displacement position between the minimum displacement positions.

4. A rotary counterbalancing mechanism as claimed in claim 1, wherein said spring means are arranged to resist the movement of the cam followers in compression.

5. A rotary counterbalancing mechanism as claimed in claim 4, wherein the spring means are arranged in longitudinal alignment with one end of each spring means anchored and the other end coupled to a respective cam follower.

* * * * *

UNITED STATES PATENT AND TRADEMARK OFFICE
CERTIFICATE OF CORRECTION

PATENT NO. : 6,364,275 B1
DATED : April 2, 2002
INVENTOR(S) : Lindsay, Richard Arthur It is certified that error appears in the above-identified patent and that said Letters Patent is hereby corrected as shown below:

Title page,
Item [57], ABSTRACT,
Line 1, change "related" to -- relates --

Column 2,
Line 66, change "28" to -- 29 --

Signed and Sealed this

Twenty-fourth Day of December, 2002

JAMES E. ROGAN
*Director of the United States Patent and Trademark Office*